F. HORNQUIST.
GLASS BLOWING APPARATUS.
APPLICATION FILED APR. 3, 1911.
1,007,571.
Patented Oct. 31, 1911.
4 SHEETS—SHEET 2.
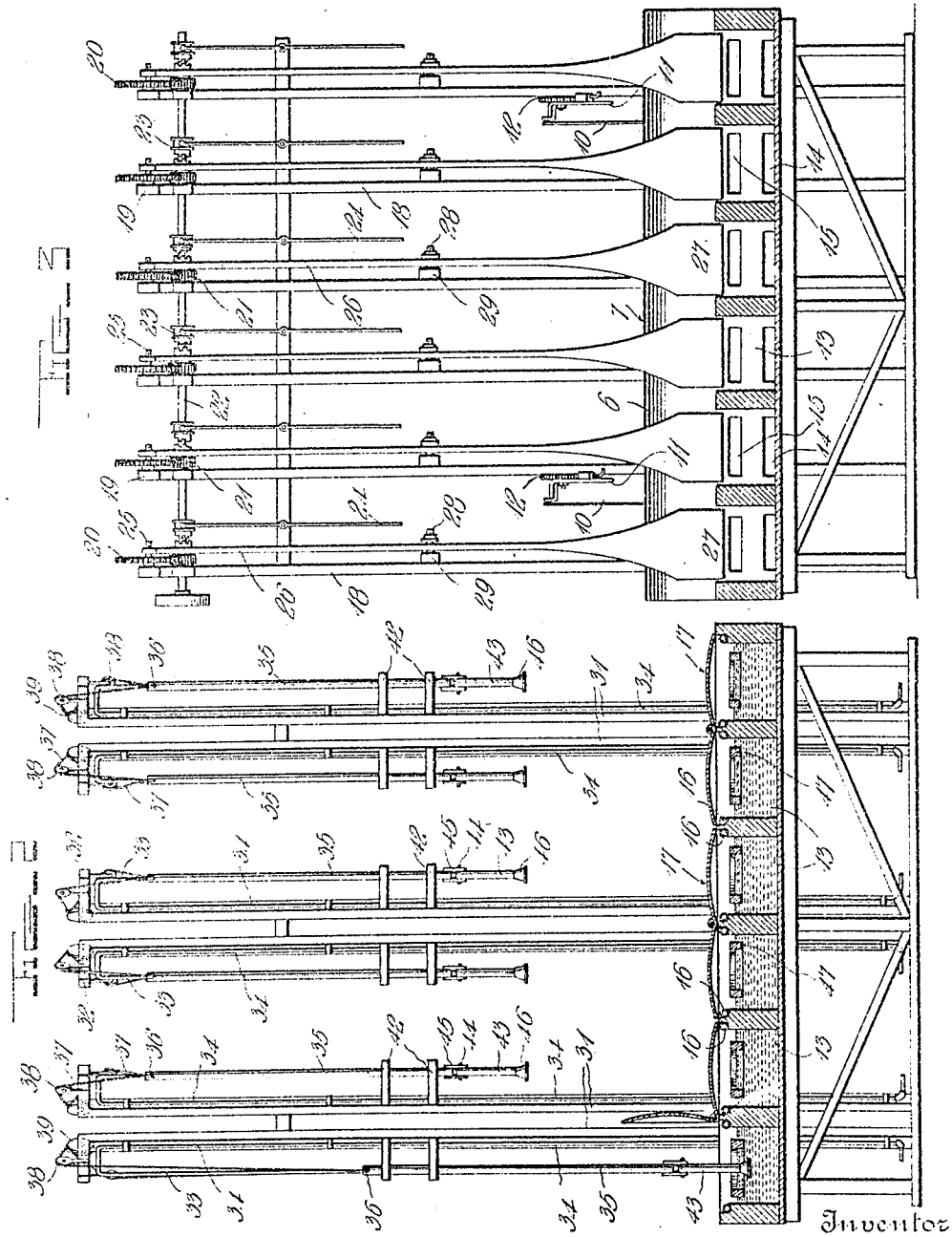
Witnesses
Inventor
F. Hornquist
by
Attorneys

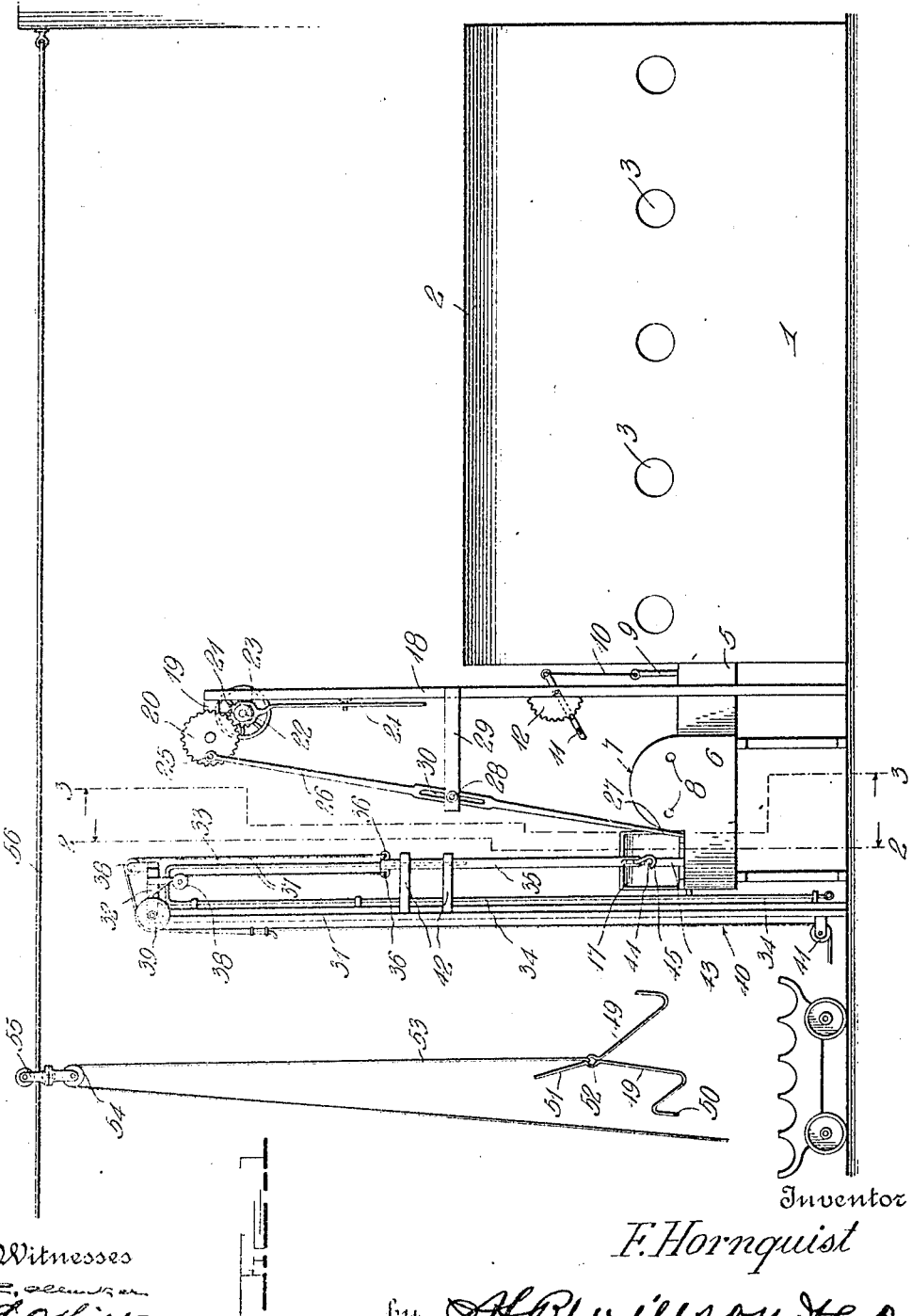

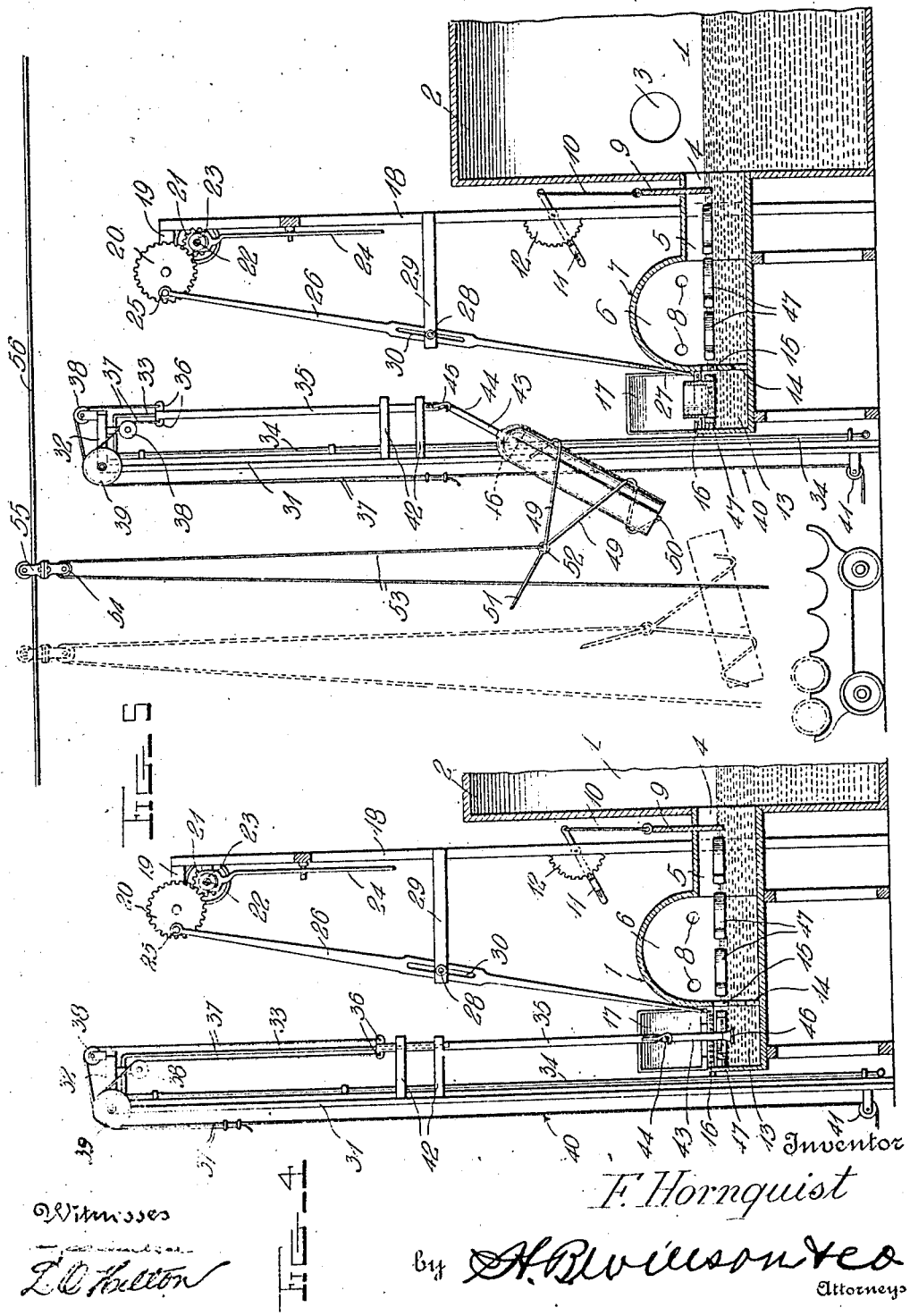

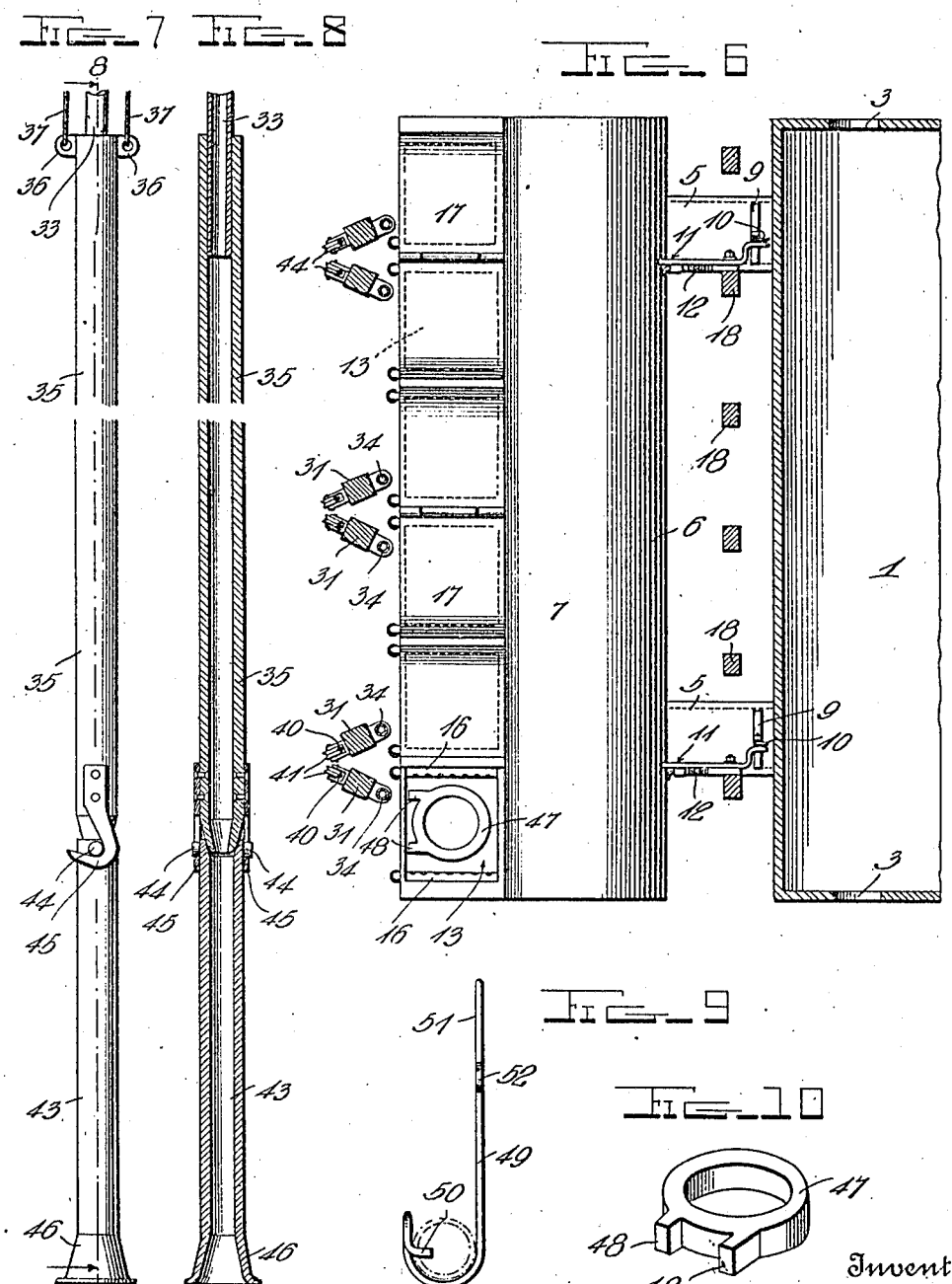

UNITED STATES PATENT OFFICE.

FRANK HORNQUIST, OF KANE, PENNSYLVANIA, ASSIGNOR, BY DIRECT AND MESNE ASSIGNMENTS, OF NINE-TWENTIETHS TO ADOLPH FIEBIG AND ONE-TENTH TO EDWARD A. McDADE, BOTH OF KANE, PENNSYLVANIA.

GLASS-BLOWING APPARATUS.

1,007,571.   Specification of Letters Patent.   Patented Oct. 31, 1911.

Application filed April 3, 1911. Serial No. 618,531.

*To all whom it may concern:*

Be it known that I, FRANK HORNQUIST, a citizen of the United States, residing at Kane, in the county of McKean and State of Pennsylvania, have invented certain new and useful Improvements in Glass-Blowing Apparatus; and I do declare the following to be a full, clear, and exact description of the invention, such as will enable others skilled in the art to which it appertains to make and use the same.

This invention relates to improvements in glass blowing apparatus.

One object of the invention is to provide a glass blowing apparatus having an improved construction and arrangement of glass melting, heat regulating and blowing tanks.

Another object is to provide an apparatus of this character having an improved construction and arrangement of blowing pipes whereby the molten glass may be readily drawn from the blowing tanks or pots and blown to the desired shape.

Still another object is to provide an improved means for receiving and conveying the roll of glass after being blown to the truck or other transporting mechanism.

A further object is to provide an improved construction and arrangement of scraping mechanism whereby the cooled glass may be readily scraped from the blowing tanks or pots.

With these and other objects in view the invention consists of certain novel features of construction, combination and arrangement of parts as will be more fully described and particularly pointed out in the appended claims.

In the accompanying drawings: Figure 1 is a side elevation of my improved glass blowing apparatus; Fig. 2 is a vertical transverse section on the line 2—2 of Fig. 1; Fig. 3 is a similar view on the line 3—3 of Fig. 1; Fig. 4 is a vertical longitudinal sectional view of the forward end of the apparatus; Fig. 5 is a similar view showing the manner in which the cylinder or roll of glass is removed; Fig. 6 is a horizontal sectional view taken immediately above the blowing pots; Fig. 7 is a detail side view of the blow pipe; Fig. 8 is a vertical section on the line 8—8 of Fig. 7; Fig. 9 is a detail end view of the glass conveying hook; Fig. 10 is a detail perspective view of one of the blowing rings.

Referring more particularly to the drawings 1 denotes the glass melting tank or furnace which is here shown and is preferably in the form of a rectangular receptacle having an arched top 2 and provided along its sides with a series of openings 3 through which the glass forming material is supplied to the tank and through which the gas burner pipes (not shown) enter the same. At a suitable elevation in the front end of the tank or furnace 1 are formed one or more glass discharging openings 4 which are connected by short channels or canals 5 with a heat regulating tank 6. The tank 6 is closed by an arched top 7 and in the ends thereof are preferably formed a plurality of openings 8 through which gas conducting pipes (not shown) enter the tank and connect with suitable burners arranged therein for heating the tank. The openings 4 between the molding tank or furnace 1 and the channels or canals 5 are adapted to be opened and closed by gate valves 9 arranged in the canals 5 adjacent to the end of the furnace as shown. The gate valves 9 are connected by rods 10 with operating levers 11 and pivotally mounted on suitable supports and adapted to be engaged with the teeth of segmental racks 12 whereby the valves 9 may be held in an open position.

Connected to or arranged on the front end of the heat regulating tank 6 are a series of blowing tanks or pots 13 which communicate with the heat regulating tank through lower passages or openings 14 and upper passages 15. Arranged in recesses formed in the upper edges of the side walls and partitions of the tanks or pots 13 are burner pipes 16 having therein a plurality of burner openings through which gas is burned for the purpose of keeping the material in the pots heated to the proper degree for blowing. The pots or tanks 13 are preferably closed when the glass is not being blown therefrom by covers 17 which are hingedly connected to the partitions between the pots and are adapted to swing upwardly to out of the way positions when glass is being blown in the pots.

In order to remove the cooled and broken pieces of glass from the blowing tanks or pots 13 I provide a scraping mechanism for each of said tanks, said mechanism comprising a series of supporting posts or standards 18 which are arranged between the molding tank or furnace and the regulating tank in line with the blowing pots as shown. On the upper end of each of the posts or standards 18 is secured a right angular forwardly projecting bearing arm or bracket 19 on the outer end of which is revolubly mounted a gear 20. The gears 20 are operatively engaged with a series of gears 21 which are loosely mounted on an operating shaft 22 journaled in suitable bearings on the upper ends of the posts or standards 18. The gears 21 are locked in engagement with the shaft 22 by suitable clutch devices 23 one of the members of which are fixed to the gears while the other members are slidably keyed to the shaft 22 and are adapted to be shifted to operative and inoperative positions by suitable shifting levers 24. On the gears 20 are arranged crank pins 25 to which are pivotally connected the upper ends of scraper levers or handles 26 on the lower ends of which are formed scraping blades 27 which are adapted to operate in the blowing tanks or pots to scoop and scrape out the cooled and broken glass therefrom. The handles 26 of the levers are pivotally and slidably connected midway between their ends to pivot pins 28 formed on right angularly projecting arms or bars 29 secured to the posts or standards 18 as shown. The scraper handles or levers 26 are engaged with the pivot pins 28 by means of longitudinal slots 30 formed therein as shown. By thus arranging the levers 26 and connecting the same with the crank pins 25 the scrapers will be reciprocated and rocked on the pivot pins 28 by the gears 20 thus projecting the blades 27 of the scrapers into and out of the blowing tanks or pots at the same time moving said blades across the pots thus scooping and scraping out the cooled and broken glass which may adhere to the sides and bottom of the tank after each blowing operation.

My improved blowing mechanism comprises a series of supporting posts or standards 31 which are arranged adjacent to the front ends of the blow tanks or pots 13 and are disposed near one corner of the same as shown. On the upper ends of the posts or standards 31 are formed right angular supporting arms 32 to which are secured the upper ends of a series of stationary blow pipe sections 33 said sections being connected at their upper ends to air conducting pipes 34 secured to the posts 31 and extending down to near the floor or ground where they are connected to any suitable air supply mechanism. Slidably engaged with the stationary section 33 of the blow pipe sections are a series of adjustable telescoping sections 35 on the upper ends of which are formed eyes 36. To the eyes 36 are connected the ends of pipe elevating cables 37 which extend upwardly and pass around guide pulleys 38 revolubly mounted on the arms 32 of the standards. From the pulleys 38 the cables 37 pass over double guide pulleys 39 and are connected to operating cables 40 which extend down and around guide pulleys 41 mounted near the lower end of the standards 31 and are connected to any suitable operating mechanism whereby when the same are actuated the outer telescoping sections 35 of the pipes are drawn upwardly from the stationary sections 33 thus drawing up a roll of glass from the blowing pots or tanks, said roll being blown simultaneously with the raising of the same from the pots by the pressure of air forced through said pipe sections from the air conducting pipes 34. The telescoping sections 35 of the pipes are steadied and guided when drawn upwardly by the cables 37 by suitable guide arms 42 arranged on the standards 31 as shown.

The lower telescoping sections 35 of the blow pipes are provided on their lower ends with hingedly connected detachable members 43 said members having on the opposite sides of the upper ends, pivot lugs 44 which are adapted to engage supporting hooks 45 arranged on the lower end of the telescoping sections 35 of the pipes. The lower ends of the pipe sections 35 are tapered or cone shaped to fit similarly shaped recesses in the upper ends of the pivoted members 43 of the pipe whereby when said members are in alinement and in operative engagement with the pipes 35 an air tight joint or connection will be formed between these parts. On the lower end of the members 43 of the pipes are formed flared head 46 to which the roll of glass adheres when said ends of the pipes are inserted in the blowing pots.

In connection with the blowing of the glass in the manner described I preferably provide blowing rings 47 through which the glass is drawn by the blow pipes. The rings 47 are preferably formed of clay and have formed on one side pot engaging lugs 4 which bear against and adhere to one side of the tank or pot and thus hold the rings in place. In practice a number of the rings 4 will be kept in the heat regulating tank at all times. The rings owing to their clay formation will float on the surface of the glass in the heat regulating tank and when it desired to blow the glass from any of the pots or tanks 13 one of said rings is drawn through the opening 15 between said pot and the heat regulating tank by means of a suitable instrument after which all dirt or foreign matter and blisters are scraped or removed from the glass within the ring by stick or other instrument provided for the purpose after which the blow pipe is let down until the end or head 46 enters the glass inclosed by the ring whereupon the blow pipes are raised and the glass drawn through the rings and blown in the manner described. After the glass has been thus drawn up and blown to the desired extent the roll of glass is cut off preferably about six inches above the ring after which the ring with the cooled end of the glass adhering thereto is again placed in the heat regulating tank and the glass thus permitted to melt off the same. At the next blowing operation from this pot a fresh ring will be drawn into the pot from the heat regulating tank as hereinbefore described. By keeping a number of the rings in the heat regulating tank it will be seen that the blowing operation may be continuously carried on.

After the roll of glass has been drawn from the pots and blown in the manner described, said roll is taken from the pipe by a suitable conveying mechanism comprising roll engaging and supporting hooks, said hooks comprising diverging arms 49 having their outer ends bent to form hooks which are adapted to embrace the roll of glass, one of said arms being bent at the end of the hook thereon to form a stop or supporting finger 50 which when the hook is applied, the roll of glass will engage the lower end thereof and thus prevent the hook from slipping up on the roll. The hook is provided on one end with a suitable handle 51 and has arranged therein an eye 52 to which is connected the lower end of a hoisting cable 53 the upper portion of which passes through a guide pulley 54. The pulley 54 is revolubly mounted in a carriage 55 which is slidably engaged with and adapted to travel on a supporting wire or cable 56 stretched above the apparatus as shown. In thus arranging the conveying mechanism the ends of the arms 49 of the hook are engaged with the roll of glass after the same has been blown and cut off from the rings in the blowing pot after which the hook by means of the handle 51 is swung to a horizontal position carrying with it the roll of glass. In thus swinging the glass up to a horizontal position the lower hinged member 43 of the pipe will be swung upwardly in the hooks 45 on the lower end of the telescoping section 35 of the pipe and when in this position the end of the glass roll connected to the pipe will be cut off as indicated in the drawings. The roll of glass after thus having its upper end cut off will be in the form of a cylindrical tube and the roll is then cut open lengthwise and swung over on the cable 56 and deposited onto a suitable truck or transporting device by means of which it is carried to the flatting room and put into an oven and reheated to a sufficient extent to permit the same to be flattened out by a suitable flattening device thus forming a sheet which may be cut to the desired size.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a glass blowing apparatus, a glass melting tank, a heat regulating tank connected to said melting tank, a series of blowing pots connected to said heat regulating tank, means to control the flow of melted glass from said melting tank to said regulating tank, a blowing mechanism adapted to be engaged with the glass in said blowing tanks, and means to remove the cold and broken remains of the glass from said blowing pots.

2. A glass blowing apparatus comprising a glass melting tank, a heat regulating tank connected thereto, a series of blow pots connected with said heat regulating tank, covers adapted to close said pots when not in use, blowing rings arranged in said heat regulating tank and adapted to be brought into said blowing pots whereby the glass may be taken from said pots through said rings, adjustably supported blow pipes adapted to be engaged with the glass in said pots, means to raise and lower said blowing pipes while the glass is being blown thereon, and means to remove the blown glass from the blowing pipes.

3. A glass blowing apparatus comprising a glass melting tank, a heat regulating tank connected thereto, a series of blow pots connected to said heat regulating tank, said pots having upper and lower feed passages connecting the same with said regulating tank, a glass blowing mechanism, said mechanism comprising a series of blow pipes having telescoping sections adapted to be drawn up and down on the stationary sections, detachable pipe members connected to the lower ends of said telescoping pipe sections whereby the roll of glass blown on said pipe may be removed after being cut from the glass in the pots, means to raise and lower said telescoping sections of the pipes, and means to engage and remove the roll of blown glass from the pipes.

4. A glass blowing apparatus comprising a melting tank, a heat regulating tank connected to said melting tank, valves to control the flow of melted glass from said melting tanks to said heat regulating tanks, a pot scraping mechanism comprising a series of supporting standards, bearing brackets arranged on the upper ends of said standards, crank gears revolubly mounted on said brackets, a drive shaft, pinions slidably keyed to said shaft, means to shift said pinions into operative engagement with said crank gears whereby the latter are driven, a series of scrapers, said scrapers being pivotally connected at their upper ends to said crank gears and adapted to be projected thereby at their lower ends into said blowing tanks, scraper rocking devices comprising a series of arms secured to said standards, pivot pins arranged in the outer ends of said members, slotted enlargements formed on said scrapers and having a sliding engagement with said pins whereby when said scrapers are reciprocated by said crank gears, the lower ends of the members will be rocked and a scooping action imparted thereto when said ends are engaged with the blow pots.

In testimony whereof I have hereunto set my hand in presence of two subscribing witnesses.

FRANK HORNQUIST.

Witnesses:
F. J. Woods,
J. T. Tuohy.